UNITED STATES PATENT OFFICE.

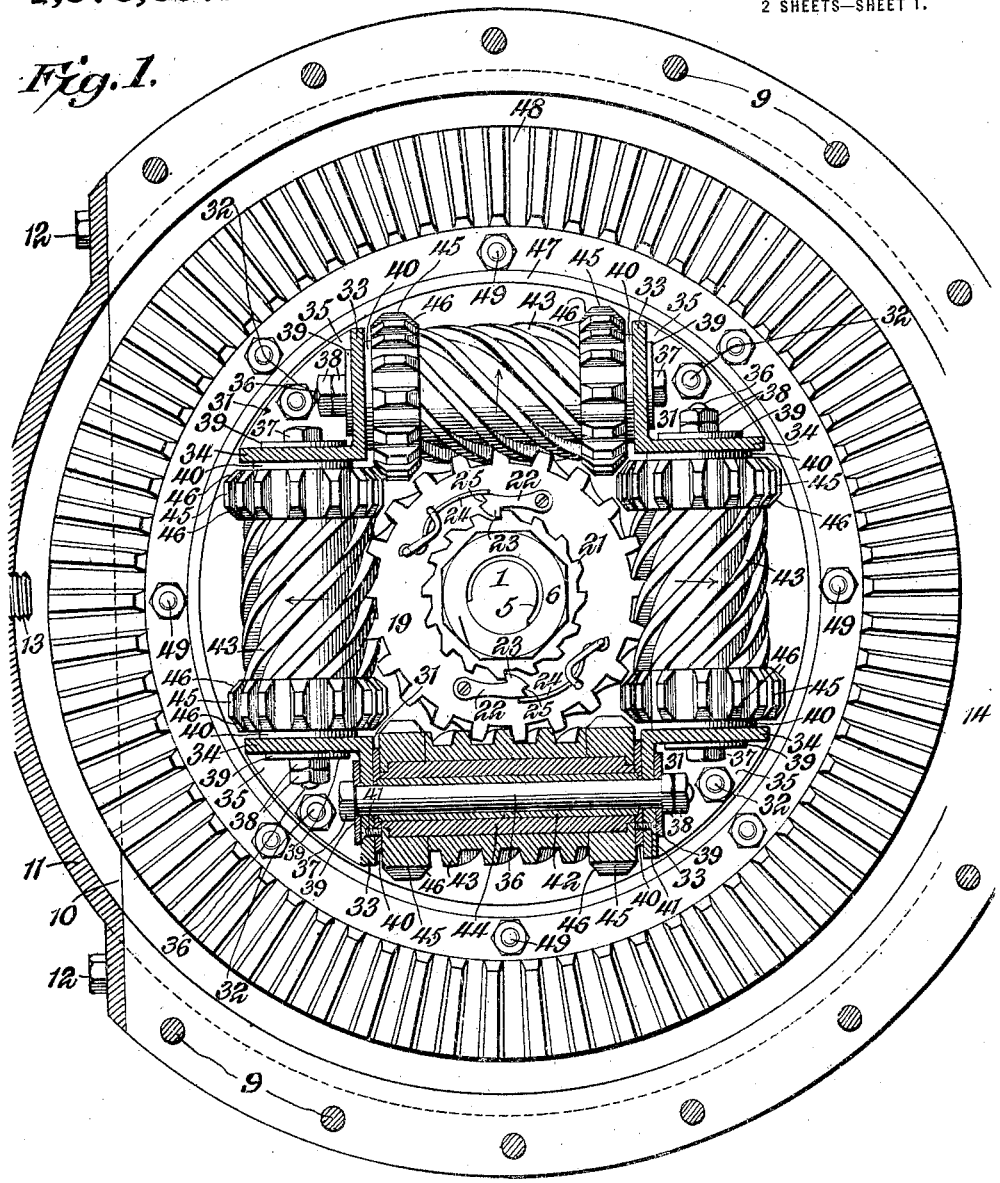

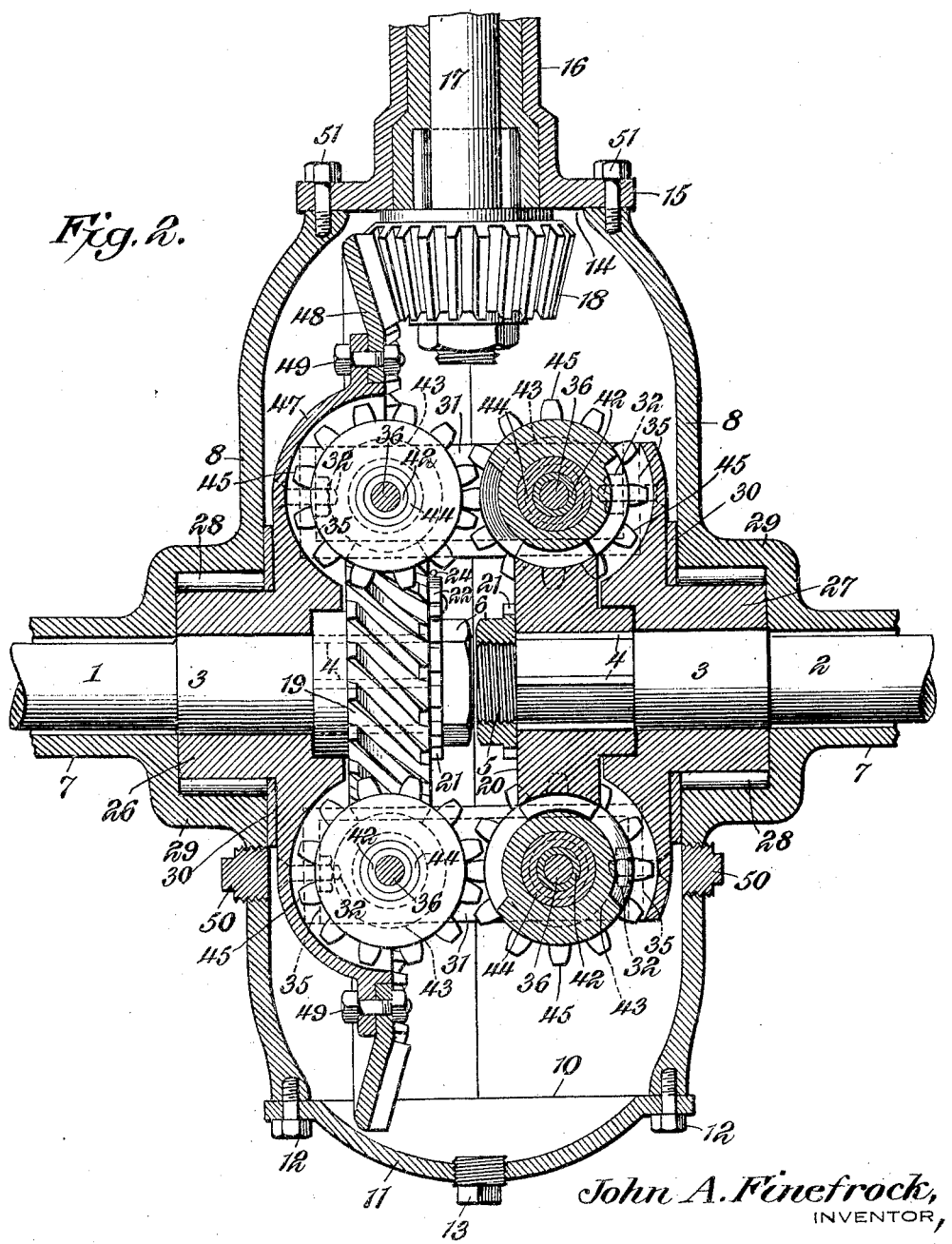

JOHN A. FINEFROCK, OF CANAL FULTON, OHIO.

DIFFERENTIAL GEARING.

1,373,657. Specification of Letters Patent. Patented Apr. 5, 1921.

Application filed April 11, 1919. Serial No. 289,369.

*To all whom it may concern:*

Be it known that I, JOHN A. FINEFROCK, a citizen of the United States, residing at Canal Fulton, in the county of Stark and State of Ohio, have invented a new and useful Differential Gearing, of which the following is a specification.

This invention has reference to differential gearing, and its object is to provide a worm differential particularly useful for all kinds of traction work, being adaptable for heavy duty as in tractors, traction engines, steam shovels and the like, and for lighter duty as in ordinary automobiles.

The invention has the advantage over other forms of differential gearing in that it may be quickly repaired and the worms and worm wheels can be taken out of the differential casing or housing without the necessity of removing the axle, and the parts may be removed and replaced in a minimum of time. The construction is such that the interior of the casing or housing may be exposed to view and access by the mere removal of a handhole cover, thus reducing labor and permitting expeditious repairs.

The invention provides locking arrangements for nuts at the adjacent ends of the axle sections, and worm gearing between the drive shaft and the axle sections so arranged that one drive wheel will not spin idly in case the wheel has no firm hold on the ground, as is the case with the ordinary bevel gear differentials. For this reason the differential of the invention permits pulling the machine out of mud-holes and the like so long as either one of the wheels has a grip on firm ground.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a section in a plane perpendicular to the longitudinal axis of the rear axle, which plane is located midway of the length of the axle.

Fig. 2 is a cross section of the differential in a plane coincident with the longitudinal axis of the axle and coincident with the longitudinal axis of the drive shaft.

Referring to the drawings, there are shown two axle sections 1 and 2 respectively. Each axle section has a smooth portion 3 beyond which, toward the inner end of the axle, it is reduced in diameter and provided with longitudinal fins 4, while the inner extremity of the axle is threaded, as shown at 5, to receive a nut 6, there being two such nuts closely adjacent in the assembled differential.

In the rear axle assembly each axle section 1 and 2 is inclosed in a casing 7 which, at the differential end of the axle section, has a lateral expansion 8 forming a housing for the differential and in this respect corresponding to ordinary differential structures. The housing 8 is of the usual sectional construction held together by bolts, indicated at 9 in Fig. 1. The housing is provided with a handhole 10 and a cap or cover 11 therefor, held in place by cap screws 12, the cap 11 having a threaded hole therethrough normally closed by a screw plug 13 which may be removed for the introduction of oil or grease into the housing.

At an appropriate point the housing is provided with an opening 14 normally covered by an expansion 15 of a casing 16 through which extends a drive shaft 17 carrying within the casing 8 a bevel gear 18, which latter may be of usual construction for transmitting power from the engine to the axle members 1 and 2 by way of differential structure inclosed in the housing 8.

Mounted on the ends of the axle members 1 and 2, where these axle members are provided with the fins 4, are worm wheels 19 and 20 respectively, being each held in place by a respective nut 6 applied to the threaded end 5 of the respective axle member 1 or 2, as the case may be. Each nut 6 is formed with ratchet teeth 21 engaged by a pawl 22 pivotally mounted on the adjacent face of the worm wheel 19 or 20, as the case may be. Each pawl 22 is provided with a tooth 23 to engage the teeth 21 of the corresponding nut 6 and the pawl is urged yieldingly toward the teeth 21 by a spring 24 carried by the ratchet wheel. The toothed end of the pawl 22 is provided with a terminal notch 25 into which the corresponding end of the spring 24 may seat, whereby the pawl may be held in yielding engagement with the ratchet teeth 21 or may be moved far enough away from these ratchet teeth for the spring 24 to snap into the notch 25 and thereby hold the pawl 22 out of the path of the teeth 21. This arrangement provides for locking the nut 6 when tightened up to prevent unscrewing of the nut, and also permits the pawl to be moved out of the way when it is desired to remove the nut. There is therefore provision for positively holding and locking the nut against accidental loosening and at the same time permitting an operator to purposely loosen and remove the nut when desirable.

Mounted on the end portions 3 of the axle sections 1 and 2 are blocks 26, 27 capable of rotating on the respective axle members. Antifriction bearings 28 are located between each block 26 and 27 and a portion 29 of the casing 8 in part seating the block. There are also provided washers 30 between each block 26 and 27 and the part 29 of the casing containing the bearings 28, these washers serving as lubricant retainers.

The blocks 26 and 27 are joined by angles 31 secured to the respective blocks 27 by bolts 32 or otherwise. The angles 31 have webs 33, 34 at substantially right angles to each other and these webs are joined at the ends by other webs 35 through which the bolts 32 pass. The angles or brackets 31 constitute connecting means between the two blocks 26 and 27, whereby these blocks are caused to move simultaneously when rotated about the longitudinal axis of the axle members 1 and 2.

Extending from each web 33 and 34 to the matching web on the other side of the differential are arbors 36 in the form of bolts with a head 37 at one end and nuts 38 at the other end, one of the nuts serving as a lock nut. On each side of each web and traversed by the arbors 36 are outer and inner washers 39, 40 respectively, the latter being secured from turning by screws 41. On each arbor 36 is a wear sleeve 42 seated in and extending from one washer 40 to the companion washer 40. Mounted on the sleeve 42 of each arbor 36 is a worm 43 provided with a bushing 44 which may be of Babbitt metal. Each worm 43 has, at each end, a pinion 45 fixed thereto so that the worm and pinions rotate together. For convenience of manufacture the worm and pinions belonging to the worm may be separately made but are effectively one-piece structures. In order that the worm wheel 19 or 20, as the case may be, may engage the worms so as to include a plurality of teeth, the pinions 45 have the side portions 46 of their teeth beveled, this also providing for the close approach of certain of the pinions to others of the pinions without interference, such close approach being shown in Fig. 1. The worms carried by one block, say the block 26, have the pinions 45 meshing with the similar pinions on those carried by the block 27 and the worms carried by each block are in mesh with the worm wheels 19 or 20, as the case may be, carried by the respective axle 1 or 2.

The block 26 beyond the portion carrying the worms has an annular extension 47 provided at its peripheral portion with a bevel gear ring 48 made fast to the extension by bolts 49. The gear ring 48 is in mesh with the bevel pinion 18 so that the shaft 17 imparts rotative movement to the block 26. The casing 8 is provided at suitable points with removable screw plugs 50 in position to expose the bolts 32 so that these bolts may be loosened and removed from the blocks 26 and 27 and the parts are so proportioned that the brackets 31 with the parts carried thereby may be reached through the handhole 10 when the cover 11 is removed and the worms 43 with their pinions 45 may be taken out of the housing without dismantling the latter to any material extent. It is necessary, however, to loosen the housing 8, the expansion 15 being held to the members of the casing 8 by cap screws 51, so that the housing or casing may be disconnected at such points.

As is customary in differential structures, the housing 8 contains a suitable amount of lubricant in the form of oil or grease when the structure is in operation. Such grease may be introduced through the opening left by the removal of the screw plug 13 and may be removed through the same opening or a similar opening. When it is desired to inspect the interior of the differential housing to ascertain whether or not, and to what extent, repairs may be needed, the handhole cover 11 is removed by first removing the cap screws 12, this leaving a large inspection opening. Now, by gaining access to the bolts 32 by removal of the plugs 50 and also by the removal of the cover 11, the brackets 31 carrying pairs of meshed pinions 45 and the worms 43 carrying the pinions may be bodily removed through the handhole 10, room enough being provided within the housing 8 for the purpose. If it be necessary to remove the worm wheels 19 and 20 the two sections of the housing must be disconnected by removing the bolts 9 and separated from the housing 16 of the shaft 17 by removing the cap screws 51. With the brackets 31 already removed the nuts 6 or one of them may be unscrewed, thus permitting the axle section 1 or 2 to be moved lengthwise for a short distance. In order to remove the nut, the corresponding pawl 22 is moved in a direction to permit the spring 24 to snap into the notch 25, thus moving the tooth 23 out of the range of the teeth 21 and by the use of a suitable wrench the nut may be unscrewed. To remove the worm wheel 19 or 20, the axle members 1 and 2 are separated sufficiently to permit the worm wheel to be moved lengthwise of the axle section to clear it from the threaded end of such axle section, whereupon, the worm wheel may be taken out of the housing 8 through the handhole 10.

If the parts be worn or broken they may be replaced by new parts and the structure may then be reassembled. The entire operation does not necessitate the taking down of the rear axle, but only the spreading or separating of the parts and may be performed even on the road in a minimum of time and with a minimum of trouble.

The invention is particularly adapted for heavy duty, for which reason the spur pinions 16 are duplicated at the ends of each worm, whereby the twisting strains which might result destructively are avoided. Furthermore, it is highly advantageous to compact the differential assembly, this being accomplished by beveling the ends of the teeth of the pinions, thus permitting a closer approach of the parts making up the assembly without interference of the teeth of the pinions of one set with those of the immediately adjacent pinions of the other set. The compacting of the structure is further advantageous in permitting the use of a casing of materially reduced capacity so that the differential carries but a relatively small amount of lubricant, this resulting in a material saving in running expenses.

While the bevel type of drive gear is shown in Fig. 2, it is to be understood that the differential is equally adapted for the worm type of drive gear.

What is claimed is:—

1. Differential gearing comprising adjacent axle sections, a worm gear on each axle section, connected blocks on the axle sections, and worms mounted on the connected blocks and engaging the worm gears, the worms on each block having pinions at each end intermeshing with those on the other block, said pinions having the corners of the teeth beveled, whereby the assembly is correspondingly compacted.

2. Differential gearing comprising adjacent axle sections, blocks mounted on the axle sections to rotate thereon, worm gears on the adjacent ends of the axle sections, angle strips connected to and connecting the blocks, worms meshing with the worm gears and mounted in and carried by the angle strips, and intermeshing pinions on the ends of the worms carried by the two blocks.

3. Differential gearing comprising adjacent axle sections, a housing inclosing the axle sections, blocks on the axle sections within the housing, worm gears on the adjacent ends of the axles, worms meshing with the worm gears, connecting members joining the blocks and provided with readily removable fastening means, and worms mounted in the connecting members and having pinions at the ends with the pinions of one worm meshing with those of a companion worm.

4. Differential gearing comprising adjacent axle sections, a housing inclosing the axle sections, blocks on the axle sections within the housing, worm gears on the adjacent ends of the axles, worms meshing with the worm gears, connecting members joining the blocks and provided with readily movable fastening means, and worms mounted in the connecting members and having pinions at the ends with the pinions of one worm meshing with those of a companion worm, the casing having a handhole for inspection and access to the worms and gears, and a cover plate of a size permitting the removal of the worms and connecting members intact.

5. Differential gearing comprising adjacent axle sections, a housing inclosing the axle sections, blocks on the axle sections within the housing, worm gears on the adjacent ends of the axles, worms meshing with the worm gears, connecting members joining the blocks and provided with readily movable fastening means, and worms mounted in the connecting members and having pinions at the ends with the pinions of one worm meshing with those of a companion worm, the casing having a handhole for inspection and access to the worms and gears, and a cover plate of a size permitting the removal of the worms and connecting members intact, the casing being provided with removable portions permitting access from the exterior of the casing to the fastening means for the connecting members.

6. Differential gearing comprising adjacent axle sections, worm gears carried by the adjacent ends of the sections, worms meshing with the gears, with each worm meshing with one worm gear having end pinions meshing with end pinions of a companion worm engaging the other worm gear, arbors on which the worms are mounted, angle brackets carrying the arbors, supporting blocks on the axle sections, and connections between the angle brackets and the supporting blocks whereby the blocks are constrained to move simultaneously in the same direction.

7. A differential gearing assembly comprising alined axle sections with the inner ends adjacent, similar gear wheels on the adjacent ends of the axle sections, supporting blocks on the adjacent ends of the axle sections, connecting members between the blocks having readily removable fastening devices for securing them to the blocks, worms with terminal pinions extending between and supported by the connecting members with the pinions of one worm meshing with those of the adjacent worm, a bevel gear ring carried by one of the blocks, a bevel drive pinion meshing with the bevel gear wheel ring, and a casing inclosing the differential gearing and the adjacent ends of the axle sections.

8. Differential gearing comprising adjacent axle sections, a worm gear at the end of each axle section facing a similar worm gear on the adjacent end of the other axle section, and a group of worms surrounding each worm gear and meshing therewith, said worms each having pinions at both ends meshing with like pinions on the like ends of the worms similarly engaging the other worm gear, the groups of worms engaging a worm gear having connecting means in the form of blocks joined by angle members and traversed by bolts constituting arbors for the worms.

9. In a differential gearing, adjacent alined shafts or axle sections with worm gears at the meeting ends, and a plurality or group of worms surrounding each worm gear and each meshing therewith, the worms of each group having means at each end meshing with the like means of the other group, and means connecting each group of worms with the other group of worms and provided with journal supports for the worms.

In testimony, that I claim the foregoing as my own, I have hereto affixed my signature.

JOHN A. FINEFROCK.